Patented July 5, 1949

2,474,923

UNITED STATES PATENT OFFICE 2,474,923

MODIFICATION OF POLYAMIDES

William Way Watkins, Buffalo, N. Y., assignor to E. I. du Pont de Nemours & Company, Wilmington, Del., a corporation of Delaware No Drawing. Application January 23, 1945, Serial No. 574,197

12 Claims. (Cl. 260—72)

This invention relates to a process for the treatment of N-alkoxymethyl polyamides and of N-alkylthiomethyl polyamides, to improve the properties thereof. More particularly, it relates to a new and improved process for treatment of N-alkoxymethyl polyamides to render the same more resistant to the action of water and certain organic solvents and also to raise the softening or melting point temperature of these polyamides.

This application is a continuation-in-part of my copending application Serial No. 520,105, filed January 28, 1944, now abandoned.

The copending patent application of Theodore L. Cairns, Serial No. 539,195, filed June 7, 1944, now Patent No. 2,430,860, describes and claims a new class of synthetic linear polyamides of the type generally disclosed in Carothers U. S. Patents Nos. 2,071,250, 2,071,253 and 2,130,948. The polyamides of this kind, generally speaking, comprise the reaction product of linear polymer-forming compositions containing amide-forming groups, for example, reacting material consisting essentially of bifunctional molecules each containing two reactive groups which are complementary to reactive groups in other molecules and which include complementary amide-forming groups. These polyamides can be obtained by the methods given in the above mentioned patents and by other methods, for example by self-polymerization of a monoaminomonocarboxylic acid, by reacting a diamine with a dibasic carboxylic acid in substantially equimolecular amounts, or by reacting a monoaminomonohydric alcohol with a dibasic carboxylic acid in substantially equimolecular amounts, it being understood that reference herein to the amino acids, diamines, dibasic carboxylic acids, and amino alcohols is intended to include the equivalent amide-forming derivatives of these reactants. The preferred polyamides obtained from these reactants have an intrinsic viscosity of at least 0.4 and a unit length of at least 7, where "unit length" is defined as in U. S. Patents Nos. 2,071,253 and 2,130,948. The average number of carbon atoms separating the amide groups in these polyamides is at least two.

These linear polyamides include also polymers, as for instance the polyester-amides, obtained by admixture of other linear polymer-forming reactants, as for instance glycol-dibasic acid mixtures of hydroxy acids, with the mentioned polyamide-forming reactants.

Both the simple and modified linear polyamides contain the recurring amide groups

in which X is oxygen or sulfur and R is hydrogen or a monovalent hydrocarbon radical, as an integral part of the main chain of atoms in the polymer. On hydrolysis with hydrochloric acid, the amino acid polymers yield the amino acid hydrochloride, and the diamine-dibasic acid polymers yield the diamine hydrochloride and the dibasic carboxylic acid, and the amino alcohol-dibasic acid polymers yield the amino alcohol hydrochloride and the dibasic carboxylic acid.

The polyamides described above are useful in many ways, particularly in the form of fibers. However, most of the prior polyamides are insoluble in common organic solvents and cannot therefore be used conveniently for the preparation of solvent cast films and coatings. Certain alcohol-soluble polyamides have been prepared previously, but these are all derived from complicated multi-ingredient systems, or by using special and expensive diamines, such as triglycoldiamine.

The polyamides treated according to the invention of Cairns must contain a hydrogen-bearing amide group. This does not mean that all the amide nitrogen atoms in the polyamide must have a hydrogen atom attached thereto. A polyamide containing both hydrogen-bearing and non-hydrogen-bearing amide nitrogens, such as can be obtained by reacting a dibasic acid with a mixture of diprimary and disecondary diamines, can be used in the process of this invention.

The preferred polyamides treated in accordance with Cairns' invention are the polycarbonamides which include the polyureas, e. g. polydecamethylene urea. Another type of polyamide of special utility is that prepared by reacting monoaminomonohydric alcohols with dibasic carboxylic acids, specifically that prepared by reacting sebacic acid and monoethanolamine. Other examples of particularly useful polyamides are described in U. S. Patents Nos. 2,071,253 and 2,130,948. However, polysulfonamides (U. S. Patents Nos. 2,321,890 and 2,321,891), e. g. the polysulfonamide derived from decamethylene-diamine and m-benzenedisulfonyl chloride, can also be used. Additional polymers which can be used are the polyurethanes and polythiourethanes (U. S. Patent No. 2,284,637), e. g. the polymer derived from decamethylenediisocyanate and decamethylene glycol; polythionamides (U. S. Patent No. 2,201,172), e. g. polydecamethylene thiourea; and polyhydrazides, e. g. that derived from hydrazine and sebacic acid.

The new products described and claimed in said application of Cairns Serial No. 539,195 include polyamides in which a portion of the nitrogen atoms of the polyamides have substituent alkoxymethyl groups. Said nitrogen substituted polyamides are prepared by reacting a linear polyamide which has an intrinsic viscosity of at least 0.4 and contains hydrogen-bearing amide groups as an integral part of the main polymer chain, with formaldehyde and a formaldehyde-reactive organic compound having hydrogen attached to an element of groups V and VI of series 2 and 3 of the periodic table, particularly an alcohol or mercaptan, in the presence of a catalyst consisting essentially of oxygen-containing acid having an ionization constant at least as great as $9.6 \times 10^{-6}$ and an equivalent conductance, measured at 25° C. in 0.01 N concentration, no greater than 370 ohms$^{-1}$, cm.$^2$.

The initial polyamides treated by the Cairns invention should be of sufficiently high molecular weight to have an intrinsic viscosity of at least 0.4 (defined as in U. S. Patent No. 2,130,948) to insure the formation of tough products. This means that the initial polyamides are those prepared from polymer-forming reactants containing complementary polymer-forming groups in substantially equimolecular amounts. Thus, if a polyamide of the diamine-dibasic carboxylic acid type is used, the diamine and dibasic acid used will be in substantially equimolecular proportion. The use of one of the reactants, e. g. the dibasic acid or an amide-forming derivative thereof such as the diester or diamide, in appreciable excess (above about 5%) leads to the formation of a polyamide of too low molecular weight to come within the scope of the initial polyamides used in the present process.

By the procedures described in said application of Cairns Serial No. 539,195, the functional group

of the polyamide (in which X is oxygen or sulfur) is converted to the functional group

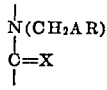

in which A is an element chosen from groups V and VI of series 2 and 3 of the periodic table and R is an organic radical. In the preferred embodiment of Cairns' invention wherein A in the last named functional groups represents oxygen or sulfur, i. e., a chalcogen of atomic weight less than 33, R represents the organic radical obtained by removal of HA from a compound of the formula HAR, wherein said compound represents a substance of the class consisting of alcohols and mercaptans in which the thiol group is attached to an aliphatic hydrocarbon, and said groups constitute at least 10% of the amide groups in the main polymer chain. The products treated in accordance with the present invention refer specifically to the substituted polyamides described above and disclosed in greater detail in said Cairns application, of which the "N-alkoxymethyl polyamide" type is preferred and will be most particularly referred to throughout this specification since it represents the type of polymer described by Cairns with which the present applicant is most concerned. The N-alkoxymethyl polyamides prepared in accordance with the process of Cairns will unavoidably contain some methylol substituent groups as well as alkoxymethyl substituent groups.

The N-alkoxymethyl polyamides as produced by the above stated reaction can be readily dissolved in numerous commonly used organic solvents, for example methanol, ethanol, water-ethanol mixtures, and acetone-methanol mixtures. Structures formed from such solutions have exceedingly interesting properties. For example, many of the resultant structures have a high elastic recovery from stretch (80% to 100% from elongations of 100% or more), an excellent pliability and a good resistance to repeated flexings, even at low temperatures. Unless these polyamides are heated at a relatively high temperature for an extended period of time, as described in the Cairns application, they are extremely sensitive to water, especially boiling water or steam, in that they will be greatly weakened thereby. They are, furthermore, soluble in many common organic solvents and have relatively low softening and melting points. Cairns discloses in his application that these deficiencies can be overcome by subjecting the products to a baking treatment. Such a baking treatment must, however, be carried out at a relatively high temperature and for an extended period of time which is not only expensive and inconvenient, but often results in an objectionable degradation of the product. The copending application of Cairns Serial No. 507,745, filed October 26, 1943, now abandoned, discloses that where the methylol groups are removed from the N-alkoxymethyl polyamides, the latter are even more difficultly insolubilized by the mere application of heat.

It is an object of this invention to provide a new and improved method for treatment of a polyamide containing the functional group

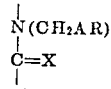

to render it less easily weakened in boiling water, to increase its melting point and to reduce the solubility thereof in organic solvents.

It is another object of this invention to provide a method for the treatment of an N-alkoxymethyl polyamide to render it less extensively weakened in boiling water, to increase its melting point, and to reduce the solubility thereof in organic solvents without objectionably degrading the same.

Other objects of the invention will appear hereinafter.

The objects of the invention may be accomplished by incorporating an acid with an N-alkoxymethyl polyamide. Preferably, the acid is maintained in contact with the polyamide until the "zero strength temperature" of the polyamide is increased at least 5° C.

Since the N-alkoxymethyl polyamides which are to be treated with an acid in accordance with the present invention gradually soften by the application of heat, it is difficult to determine the exact softening or melting point temperature of these materials. In order to provide an exact measurement of the temperature of softening or melting, a "zero strength temperature" determination has been devised. The determination of the temperature at which a synthetic linear polyamide has a zero strength is made as follows:

An electrically heated, smooth, chromium plated cylinder (½ inch in diameter) is equipped with a surface pyrometer to measure the surface temperature of the cylinder. The electrical heating element in the cylinder is attached to a source of electric current which will heat the cylinder at a rate of 70° C. per minute between 100° C. and 170° C. The strip of synthetic linear polyamide to be tested for zero strength temperature is positioned to firmly contact the cylinder closely adjacent the pyrometer and a small weight (12 pounds per square inch cross-section of the film) is attached to the bottom end of the film. In order to insure firm contact between the film and cylinder, the film is made to contact the cylinder over an arc of about 45°. In carrying out the tests, it is most convenient to use a film having a thickness of 0.002 inch, a width of 0.116 inch and a length of 3 to 4 inches, and a weight of 1.35 grams is attached to the bottom end thereof. The film is lowered into contact with the cylinder when the latter has a temperature of 100° C. The temperature at which the film breaks is observed by a pyrometer reading. This temperature is taken as the zero strength of the film. Throughout the specification and claims reference to "zero strength temperature" designates a breaking temperature as determined in the above-defined manner.

The following detailed examples are given to illustrate certain preferred processes for practicing the present invention, it being understood that the details set forth in the examples are for the purpose of illustration and are therefore not to be taken as limiting the scope of the invention.

*Example I*

(This example illustrates a preferred procedure for converting a highly substituted, N-methoxymethylpolyhexamethylene adipamide to a more desirable product having the same high degree of elasticity, but being resistant to hot water.)

A solution of N - methoxymethylpolyhexamethylene adipamide (about 52% amide substitution) was prepared by stirring a mixture of 48.0 parts of the polymer, 0.48 part of maleic acid, 89.6 parts of methanol and 22.4 parts of water for one hour at 60° C. A film was prepared by flowing the viscous solution on to a glass plate. After evaporation of the solvent at room temperature, the film (still on the plate) was heated in an oven for six hours at 60° C. Analysis showed that this heat treatment removed 27% of the methoxyl groups from the original methoxymethyl polyamide. The resulting, highly elastic, rubbery film was unaffected by boiling water or steam, was infusible at 300° C. and was insoluble in hot aqueous alcohol. In contrast, a film prepared from a similar solution containing no maleic acid and similarly heated, disintegrated in boiling water, had a zero strength temperature of 111° C. and was alcohol soluble. In addition, the film prepared in the presence of maleic acid exhibited higher tensile strength (wet or dry) than the film prepared from a solution containing no acid and was greatly superior in resistance to the penetration of gasoline (0.005 vs. 0.031 oz./sq. ft./24 hrs.). Both the films showed over 90% elastic recovery from 300% to 500% elongation, were very pliable and had a high degree of resistance to repeated flexings and did not crack when bent sharply at temperatures as low —55° C.

*Example II*

A solution of N-methoxymethyl-polyhexamethylene adipamide (49% of amide groups substituted with methoxymethyl groups) was prepared by stirring a mixture of 100 parts of the polymer, 120 parts of methanol, 30 parts of water and 1 part of maleic acid for one hour at 60° C. A film was prepared by flowing the viscous solution on to a glass plate. After evaporation of the solvent at room temperature, the film was removed from the plate and suspended in an oven for five minutes at 100° C. The resulting, highly elastic film was resistant to boiling water, was infusible at 300° C. and was insoluble in hot aqueous alcohol. In contrast, a film prepared in identical fashion but from a solution containing no maleic acid catalyst and baked for twenty minutes at 100° C. (off the plate) melted in boiling water, had a zero strength temperature of 107° C. and was soluble in hot aqueous ethanol. Other comparative data for the two films were as follows:

| | Maleic Acid | No Maleic Acid |
|---|---|---|
| Tensile strength in lb./sq. in. (50% R. H.). | 1,710 | 550. |
| Tensile strength in lb./sq. in. (wet) | 1,170 | 0. |
| Break Elongation, per cent | 395 | 375. |
| Elastic recovery, per cent at 100% stretch. | 96 | 93. |
| Pliability | over 200 | over 200. |
| Flexes required to effect cracking [1] | over 33,000,000 | 295,000. |

[1] Schiltknecht flex test at 25° C. (Bull. 105 Alfred Suter Co., 200 Fifth Avenue, New York city).

Thus, the maleic acid catalyst conferred infusibility, insolubility, hot water resistance, flex durability and higher tenacity (wet and dry) without changing other desirable properties, such as high elongation, elasticity and pliability.

*Example III*

(This example illustrates a preferred acid treatment of a moderately substituted N-methoxymethyl-polyhexamethylene adipamide in order to improve its resistance to hot water, to make it less permeable to hydrocarbons such as gasoline and to improve its resistance to cracking on repeated flexing.)

Films were prepared and heat treated as described in Example I from less highly modified N-methoxymethyl-polyhexamethylene adipamide (about 33% amide substitution). The film prepared from a solution containing maleic acid was resistant to boiling water and showed great resistance to cracking on repeated flexing, as compared to the water sensitive film prepared from a solution containing no maleic acid. It had a zero strength temperature of more than 300° C. It had an elastic recovery of 74%. Analysis showed that 16.6% of the original methoxyl groups had been removed.

Films prepared by coating the maleic acid-containing solution on synthetic or natural rubber sheets and then heating at 100% C. for a few minutes showed excellent adhesion to the rubber substrate and were not damaged by exposure to steam under rubber vulcanization conditions.

Example IV (This example illustrates the use of a weak dibasic acid catalyst which produces a product having extremely good adhesion to surfaces such as glass.)

A solution consisting of 48 parts of N-methoxymethyl-polyhexamethylene adipamide (about 33% amide substitution), 89.6 parts of methanol, 22.4 parts of water and 4.8 parts of sebacic acid was flowed on a plate. After air drying, the film while still on the plate, was heated in an oven at 100° C. for twenty-four hours. The resulting film was then so adherent to the glass plate that it could not be stripped off even after immersion in water for seven days. The film had a zero strength temperature of more than 300° C.

Example V (This example illustrates the use of a strong acid catalyst in order to accelerate the speed and degree of modification.)

A solution was prepared as described in Example III using 0.48 part of p-toluene sulfonic acid instead of the maleic acid. A film prepared from this solution and air dried for about forty-eight hours was unaffected by boiling water and was strong, pliable and elastic. Analysis showed that this treatment removed 49% of the methoxyl groups in the original polymer. Interesting data on this film are:

|  | Catalyst | No Catalyst |
|---|---|---|
| Tensile strength | 4,700 lb./sq. in. | 4,500 lb./sq. in. |
| Elongation, per cent | 328% | 387%. |
| Pliability | 53 | 48. |
| Elastic Recovery, per cent at 100% stretch. | 62% | 71%. |
| Effect of boiling water | None | Melts. |
| Zero strength temperature | infusible at 300° C | 107° C. |

A similar film heated for six hours at 60° C. on a glass plate showed increased tensile strength and elasticity with much greater stiffness (lower pliability) and lower extensibility. Analysis revealed that in this case the heat treatment brought about an 88% loss of methoxyl groups. Interesting data on this film are:

|  | Catalyst | No Catalyst |
|---|---|---|
| Tensile strength | 7,310 lb./sq. in. | 4,100 lb./sq. in. |
| Elongation, per cent | 49% | 441%. |
| Pliability | 11 | 48. |
| Elastic Recovery from break elongation. | 84% | 70%. |
| Effect of boiling water | None | Melts. |
| Zero strength temperature | infusible at 300° C | 107° C. |

It will be seen that a strong acid catalyst such as p-toluenesulfonic acid confers hot water resistance without any heat treatment and gives stiffness with extended heat treatment.

Example VI (This example illustrates the modification of a preformed N-ethoxymethyl-polyhexamethylene adipamide film with an acid catalyst. In addition, it illustrates the use of a mineral acid catalyst, such as phosphoric acid.)

A 2.0 mil thick film of N-ethoxymethyl-polyhexamethylene adipamide (about 28% amide substitution) was soaked in 1% aqueous H₃PO₄ at room temperature for forty minutes, removed from the solution and the free solution wiped off the surface of the film. The film was baked at 105° C. for five and a half hours whereby 79% of the ethoxyl groups were removed. It was found that this treatment increased the tensile strength both wet and dry, increased the stiffness (i. e. decreased the pliability) and lowered the elongation. The film also had excellent resistance to boiling water. The zero strength temperature of the film was increased more than 20° C.

Example VII (This example illustrates the modification of N - isobutoxymethyl - polyhexamethylene adipamide with an acid catalyst.)

A solution was prepared by stirring 48.0 parts of N-isobutoxymethyl-polyhexamethylene adipamide (about 58% amide substitution), 89.6 parts of methanol, 22.4 parts of water and 0.48 part of maleic acid at 60° C. for one hour. Films were prepared by flowing the solution on glass plates and air drying. A film baked at 100° C. for one hour (on the plate) was resistant to boiling water, was infusible at 300° C. as against a zero strength temperature of 194° C. for a similar uncatalyzed film, and had good tensile strength, elongation, pliability and an elastic recovery of 72% at an elongation of 100%.

Example VIII (This example illustrates the use of a monobasic acid catalyst to convert one of the preferred N - methoxymethyl - polyhexamethylene adipamide products (32.9% amide substitution) to a hot water resistant product.)

A film prepared as described in Example III containing 0.48 part of formic acid instead of the maleic acid, was heated at 100° C. for six hours on a glass plate. This brought about a loss of about 4% of the original methoxyl groups. The resulting film was less affected by boiling water than "control film" heated under the same conditions, but containing no acid catalyst. The zero strength temperature of the film was increased over 20° C. The treated product had essentially the same pliability as the original polyamide and had an elastic recovery of 83% when stretched 100%.

Example IX

A solution of N-methoxymethyl derivative of an interpolymer of hexamethylene diammonium adipate and hexamethylene diammonium sebacate (30:70) (37% amide substitution) was prepared by stirring a mixture of 35 parts of polymer, 65 parts of ethyl alcohol and 1.75 parts of citric acid at 70° C. for one hour. A film was prepared by flowing the warm solution on a glass plate and allowing the solvent to evaporate at room temperature. The dried film was suspended in an oven at 100° C. At the end of ten minutes, the film was found to be infusible although it still possessed excellent elasticity. These properties were substantially unchanged after two hours in the oven. Analysis showed that 10% of the methoxyl groups had been removed. A similar uncatalyzed film was found to have a zero strength temperature of 110° C.

Example X (This example describes the use of an N-alkoxymethyl polyamide as a coating for various synthetic films.)

A solution of the N-methoxymethyl derivative of an interpolymer of hexamethylene diammonium adipate and hexamethylene diammonium sebacate (30:70) (42% amide substitution) was prepared as in Example IX, using maleic acid as the catalyst in place of citric acid.

A thin coating was obtained by flowing this solution on a film of polyvinyl alcohol and evaporating the solvent at 40° C. At this stage, the coating could be stripped from the base sheet and was found to have a zero strength temperature of about 100° C. When, however, the coated film was heated at 100° C. for five minutes, the coating could not be removed and was found to be infusible. Analysis showed that 3% of the methoxyl groups had been removed.

The solution described above was coated on both sides of polyvinyl alcohol, regenerated cellulose and cellulose acetate films. The coated films were then subjected to a temperature of 100° C. for a period of five minutes. At the end of this period, it was found to be impossible to remove the coatings even on prolonged soaking in hot water. A subsequent soaking in cold water for one month failed to remove the coatings.

The process of the present invention is applicable to the treatment of any N-alkoxymethyl polyamide regardless of the specific alkoxy group, the specific polyamide or the number of alkoxymethyl substituent groups contained therein. From the viewpoint of the desirability of the resultant product, the present invention will have its greatest utility in the treatment of the N-alkoxymethyl derivative of hexamethylene adipamide polymer since the latter is produced in large quantity commercially. The preferred alkoxymethyl derivative is the N-methoxymethyl derivative of hexamethylene adipamide polymer containing between 30% and 60% amide substitution. Such polymers having between 30% and 60% amide substitution exhibit exceptional elasticity and high recovery from stretch.

The N-alkoxymethyl polyamide may be treated with an acid regardless of the physical form thereof. This invention contemplates particularly the incorporation of the acid catalyst in a solution of the polyamide with the subsequent formation of the product from the solution, for example yarns, films, fabrics, sponges, coatings and the like. The invention however also contemplates the incorporation of the acid catalyst in the preformed structure. When the acid catalyst is incorporated in a solution of the polyamide, alcohols which may be present in the solvent medium are removed by evaporation, preferably at or about room temperature, before the elevated temperature is applied to effect cross-linking, as is shown in the examples. Removal of the alcohols, such as methanol for example, from any solvent medium containing the same, prior to or during the heat treatment, makes it possible to split off the methanol contained in the polymer molecule with concomitant cross-linking.

The present invention is applied in particular to N-alkoxymethyl polyamides and the other related compounds described herein which have, after their formation, been freed from the components of the reaction mixture.

The invention may be carried out with any acid, organic or inorganic, and preferably by heating at a temperature above 50° C. As indicated by the examples, acids of any type and strength can be used. Preferably however, acids of medium or high strength are used since the time of the treatment can thereby be greatly shortened. The preferred acids have an ionization constant for the first hydrogen of between $1 \times 10^{-1}$ and $1 \times 10^{-4}$. It is furthermore preferred that the acids be reasonably non-volatile under the heating conditions used.

The time and temperature under which the treatment is carried out depend somewhat upon the type of polyamide and the catalyst used. A range of 0° C. to 300° C. or more, and preferably 50° C. to 150° C., will be found generally useful. In this connection, it is to be noted that many of the examples show a time of treatment which is relatively long. These times were chosen for simplicity of experiment; substantially similar results will be obtained by considerably shortening the treatment time of the examples. As is shown in Examples IX and X, relatively short times can be used successfully. Generally, the minimum time of treatment is preferred to avoid heat degradation of the material.

One skilled in the art will understand, for example, that the strength of the acid in part determines the time of treatment to obtain a particular result at a given temperature and that the stronger the acid the shorter will be the time of treatment. The stronger acids falling within the scope of the invention, for example p-toluenesulfonic acid, are effective at room temperatures. Acids of intermediate strength, such as maleic acid, are more useful at temperatures in the range of 60° C. to 120° C., the time of heating in the case of unsupported films being from a few seconds to an hour. Weak acids such as sebacic acid are preferably used at temperatures of 100° C. or higher for a period of an hour or more.

Since the acid used in the treatment is not consumed thereby, it must be assumed that the acid acts in a catalytic capacity. Being a catalytic agent, the quantity of acid to be employed is not critical above a minimum. In general, quantities of the order of 0.01% and 20% based on the polyamide derivative are found to be useful. The quantity to be used depends upon the particular polymer, the particular catalyst and the reacting conditions, and the product desired. When it is desired to produce a soft elastic yarn, it is generally preferred to use about 0.5% of the acid catalyst. On the other hand, when it is desired to produce a hard, adherent film, it is generally desired to have the acid present in a quantity of about 10%.

As has been shown in the examples, the formed alkoxymethyl polyamide may be treated with the catalytic acid and baked, or in many cases the catalytic acid may be added to the solution from which the formed structure is produced. Similarly, it is sometimes satisfactory to leave the catalytic acid in the structure, but it will usually be found advantageous to remove it by thorough washing.

Analysis of the polyamide shows that the above described acid treatment will remove a number of the alkoxy groups from the polyamide. The number of alkoxy groups removed by the baking treatment may vary over a reasonable range and will determine the characteristics of the final product. For example, starting with an N-methoxymethyl-polyhexamethylene adipamide in which 30% to 60% of the amide groups have been converted into N-methoxymethyl amide groups, it has been found that when an acid treatment is comparatively mild (less than 8% of the alkoxy groups removed), the pliability of the product and the resistance to cracking on repeated flexing is not materially changed with respect to the original N-methoxymethyl compound. When the treatment is of moderate intensity (sufficient to remove from 10% to 30% of the alkoxy groups), the flexibility is essentially unchanged, but the resistance to cracking on repeated flexing is greatly increased. Finally, when the treatment is severe (more than 30% of the alkoxy groups removed), both the flexibility and the resistance to cracking on repeated flexing are decreased. Using an N-methoxymethyl-polyhexamethylene adipamide as stated, it is preferred that between 2% to 30% of the alkoxy groups have been removed. The removal of between 2% and 30% of the alkoxy groups will produce an exceptionally desirable elastic product. It might be pointed out in this connection that the optimum degree of removal of alkoxy groups increases with the degree of alkoxymethyl substitution on the original polyamide and that, of course, the optimum degree will vary depending on the characteristics which it is desired to have in the final product.

Although I do not wish to be limited by any theory involved in the mechanism of the invention and the reactions which take place as a result of the acid treatment, there is definite evidence as a result of the many chemical analyses that the acid treatment causes a cross-linking to take place between the molecules of the polyamide. The following theory is offered since it appears to be a plausile explanation of the mechanism of the insolubilization treatment of the present invention. Definite proof of this theory is however lacking.

By removing the alkoxy portion of a number of the alkoxymethyl groups, the hydrogen-bearing nitrogen atoms of one or more molecules are believed to be cross-linked to the alkoxymethyl-bearing nitrogen atoms of other polyamide molecules with the elimination of alcohol, the acid apparently functioning in the capacity of a catalyst. The following illustrative reaction shows how the nitrogen atoms of the adjacent methoxymethyl polyamide molecules containing both hydrogen-bearing and methoxymethyl-bearing nitrogen atoms may be cross-linked in the presence of an acid catalyst with the elimination of methyl alcohol:

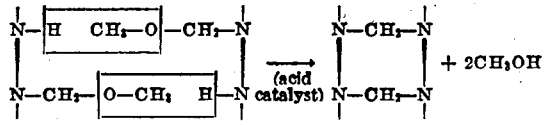

By reason of this invention, a notable advance in the technology of these polyamides is made. It is true that the availability of soluble modifications of basic polyamides was an important advance. It permitted the production of formed products such as a coating on delicate leather goods which was not possible with the melt casting or coating of the basic polyamide. In addition, the soluble polyamide derivatives have properties which for some purposes were a distinct improvement over the basic polyamide. Reference is made especially to better pliability especially at low temperature and to definitely superior elasticity. It is true that it is known to insolubilize the soluble polyamides, containing both alkoxy groups and methylol groups, by treatment with heat. This method, however, requires so long an exposure at the elevated temperatures that the product is frequently decomposed to an objectionable extent. Additionally, the time is too long for many practical applications. The acid insolubilization of this invention provides a method of securing by practical conditions insoluble derivatives of these alkoxymethyl polyamides, whether or not they contain methylol groups, thus largely increasing the field of utility of these materials. Quite as important, the insolubilization treatment, unless it is continued for too long a time, does not materially alter the valuable characteristics of the soluble alkoxymethyl polyamides such as pliability and marked elasticity. It does contribute the very important characteristics of resistance to boiling water and insolubility in common solvents, and the raising of the fusing point is well above any temperature encountered in the service of the article. There is thus available in a practical way a new chemical compound of intensely interesting properties in a very broad application.

The products of this invention find utility as yarns, fibers, films, adhesive compositions, coatings, sponges, coatings and interliners for fabrics, safety glass interlayers and similar formed products.

Since it is obvious that many changes and modifications can be made in the above described details without departing from the nature and spirit of the invention, it is to be understood that the invention is not to be limited to the details described herein except as set forth in the appended claims.

I claim:

1. In the process of treating a linear polyamide having an intrinsic viscosity of at least 0.4 and containing as an integral part of the main polymer chain recurring groups of formula

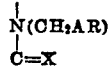

which are separated by an average number of carbon atoms of at least 2 and wherein A represents a chalcogen of atomic weight less than 33, R represents the organic radical obtained by removal of HA from a compound of formula HAR, wherein said compound represents a substance of the class consisting of alcohols and mercaptans in which the thiol group is attached to an aliphatic hydrocarbon, and X represents a chalcogen of atomic weight less than 33, said groups constituting at least 10% of the amide groups in the major polymer chain, the steps which comprise incorporating with said polyamide a catalytic amount of an acid having an ionization constant for the first hydrogen of between 1 x 10⁻¹ and 10 x 10⁻⁴, and maintaining said polyamide in contact with said acid until the zero strength temperature of the polyamide is increased at least 5° C.

2. The process of claim 1 in which the acid is incorporated in an alcohol solution of the polyamide and in which the alcohol is subsequently removed without removal of the acid.

3. The process of claim 1 in which the acid is incorporated in a formed structure by soaking the formed structure with a solution of the acid.

4. The process of claim 1 in which the acid is present in an amount between 0.01% and 20% by weight, based on the weight of the polyamide.

5. In the process of treating a linear polyamide having an intrinsic viscosity of at least 0.4, and containing, as an integral part of the main polymer chain recurring groups of formula

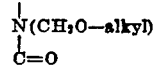

which is separated by an average number of carbon atoms of at least 2, said groups constituting at least 10% of the amide groups of the main polymer chain, the steps which comprise incorporating with said polyamide from 0.01% to 20% by weight, based on the weight of the polyamide, of an acid having an ionization constant for the first hydrogen of between $1 \times 10^{-1}$ and $1 \times 10^{-4}$, and maintaining said polyamide in contact with said acid until the zero strength temperature of the polyamide is increased at least 5° C.

6. The process of claim 5 in which the polyamide in contact with the acid is baked at a temperature of from 50° to 150° C., until the zero strength temperature of the polymer is increased at least 5° C.

7. The process of claim 5 in which the acid is maleic acid.

8. The process of claim 5 in which the acid is phosphoric acid.

9. The process of claim 5 in which the acid is p-toluene sulfonic acid.

10. The process of claim 5 in which the polyamide is N-methoxymethyl hexamethylene adipamide polymer.

11. The process of claim 10 in which between 30% and 60% of the amide groups of the polyamide are the methoxymethyl substituted amide groups.

12. The process of claim 10 in which the methoxy portions of the methoxy methyl groups are removed from at least 2% and not to exceed 30% of the total number of methoxymethyl groups.

WILLIAM WAY WATKINS.

REFERENCES CITED

The following references are of record in the file of this patent:

UNITED STATES PATENTS

| Number | Name | Date |
|---|---|---|
| 2,141,169 | Catalin | Dec. 27, 1938 |
| 2,173,005 | Strain | Sept. 12, 1939 |
| 2,191,957 | Edgar et al. | Feb. 27, 1940 |
| 2,244,184 | Austin et al. | June 3, 1941 |
| 2,317,181 | D'Alelio | Apr. 20, 1943 |
| 2,373,135 | Maxwell | Apr. 10, 1945 |